Patented Mar. 17, 1942

2,276,554

UNITED STATES PATENT OFFICE 2,276,554

PHOTOGRAPHIC EMULSION

Gustav Wilmanns, Wolfen, Kreis Bitterfeld, and Oskar Riester, Dessau, Germany, assignors, by mesne assignments, to General Aniline & Film Corporation, New York, N. Y., a corporation of Delaware No Drawing. Application November 13, 1939, Serial No. 304,172. In Germany November 2, 1938

4 Claims. (Cl. 95—7)

This invention relates to photographic emulsions and more particularly to photographic emulsions for color photography containing color-forming development components.

A modern process for the production of multicolored pictures employs multi-layer photographic materials in which the differently sensitized silver halide emulsion layers contain different dyestuff components fast to diffusion.

It has been found that not all dyestuffs can be employed for the sensitization of such silver halide emulsions which on account of their sensitizing range would appear suitable, since many of the known sensitizers which possess per se excellent sensitizing properties are greatly impaired or even entirely lose their sensitizing capacity in the presence of dyestuff components for color-forming development. In various prior U. S. applications to the same assignee Ser. Nos. 145,066 filed May 27, 1937, 153,516 filed July 14, 1937, 279,910 filed June 19, 1939, and 280,352 filed June 21, 1939, some groups of sensitizers have been proposed, the sensitizing action of which is not diminished by the presence of color formers.

It is an object of the invention to provide a novel silver halide emulsion containing a color-forming development component and a dyestuff, the sensitizing action of which is unimpaired by the presence of said component.

A further object of the invention is the provision of sensitizing dyes suitable for use in color-forming development.

Further objects of the invention will become apparent from the detailed description following hereinafter.

We have found that for the sensitization of silver halide emulsions with dyestuff components for color-forming development rhodacyanine dyes which contain in the polymethine chain a rhodanine ring and which have the general formula

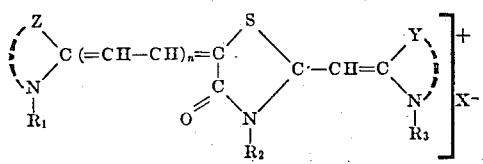

wherein Y and Z stand for O, S, Se,

—CH=CH—, —S—C=N—, Y and Z being members of heterocyclic rings or condensed heterocyclic ring systems which may be substituted, $R_1$, $R_2$, and $R_3$ stand for H, alkyl, aralkyl, aryl, X stands for an anion, for instance Cl, Br, I, $SO_4H$, $ClO_4$, $SO_4CH_3$, $SO_4C_2H_5$, $n$ stand for 1 or 2, are especially suitable. These sensitizing dyes may be prepared according to the process described in U. S. patent application Ser. No. 237,474 filed October 28, 1938. The dyes have a polymethine chain which is interrupted by a rhodanine nucleus and which has at both ends nitrogen containing heterocyclic ring systems such as are well known in the chemistry of sensitizing dyes.

It must be especially emphasized that the sensitizing capacity of these dyes is not only maintained in the presence of color-forming development components but is increased and in part rendered more selective. This entirely new property is most surprising. An additional especial advantage of the new sensitizers consists in the fact that a perfectly uniform sensitizing range is obtained in casting several batches of emulsion, a feature which is of paramount importance for the production of multi-layer films. It is further possible to comprise the entire spectral region of the red-sensitive part of the material used for exposure, that is from orange-red to purple. This is highly important for the material used for exposure which necessitates a sensitization of shorter wave lengths, as well as for the printing material in which the deep red region is employed.

It must further be noted that comparatively small amounts of the sensitization dye suffice for the production of a satisfactorily intense and uniform sensitization whereby any coloring of the layers is prevented from the start, a feature of especial importance for the production of paper positives. At the same time, however, it is also possible to employ greater amounts of the sensitizer without impairing the excellent sensitizing properties. These dyes are furthermore characterized by good fastness and absence of fogging.

Of the dyes which come within the general formula above given those are also useful within the ambit of the invention the absolute sensitizing range of which is not excessive, but is sufficient for the production of a desired intensity, which is in conformity with the intensity of the other layers.

The following dyes may be named as examples:

Example 1

A violet-blue dyestuff of the following constitution:

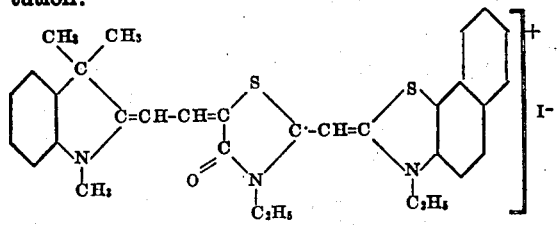

|   | Mµ |
|---|---|
| Absorption maximum in methanol | 585 |
| Sensitizing maximum | 615 |
| Sensitizing range | 540 to 640 |

Example 2

A blue violet of the following constitution:

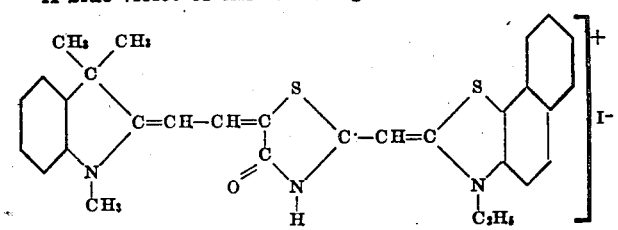

|   | Mµ |
|---|---|
| Absorption maximum in methanol | 595 |
| Sensitizing maximum | 635 |
| Sensitizing range | 550 to 670 |

Example 3

A blue dyestuff of the following constitution:

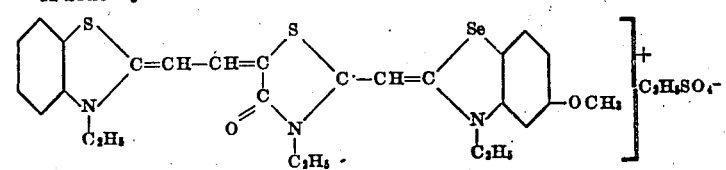

|   | Mµ |
|---|---|
| Absorption maximum in methanol | 605 |
| Sensitizing maximum | 640 |
| Sensitizing range | 555 to 675 |

Example 4

A blue dyestuff of the following constitution:

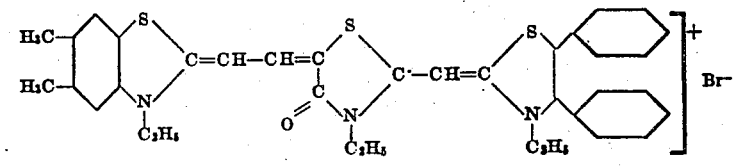

|   | Mµ |
|---|---|
| Absorption maximum in methanol | 605 |
| Sensitizing maximum | 635 |
| Sensitizing range | 545 to 675 |

Example 5

An ice-blue dyestuff of the following constitution:

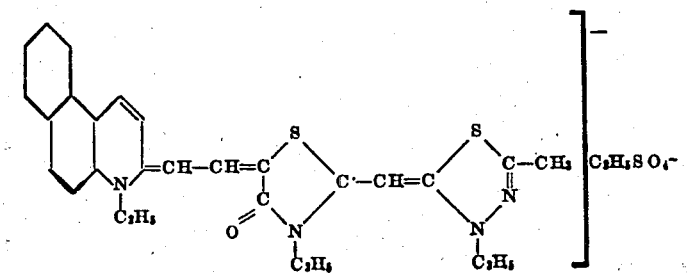

Absorption maximum in methanol.. 625 mμ and weaker at 580 mμ
Sensitizing maximum_____ 660 mμ
Sensitizing range_____ 560 to 695 mμ

*Example 6*

A blue-green dyestuff of the following constitution:

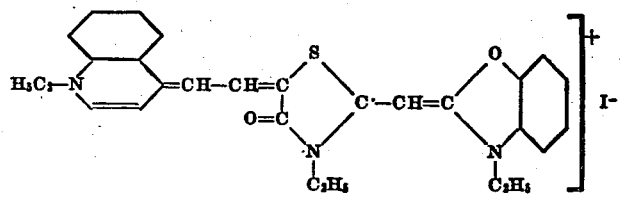

| | Mμ |
|---|---|
| Absorption maximum in methanol | 660 |
| Sensitizing maximum | 700 |
| Sensitizing range | 620 to 730 |

*Example 7*

An ice-blue dyestuff of the following constitution.

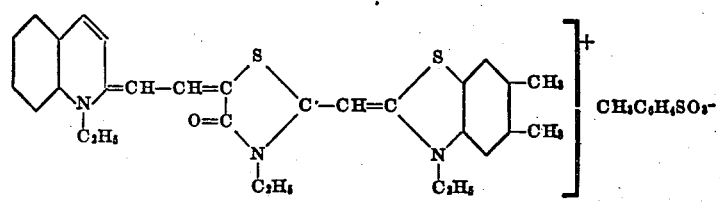

Absorption maximum in methanol.. 630 mμ and weaker at 685 mμ
Sensitizing maximum_____ 660 mμ
Sensitizing range_____ 595 to 670 mμ

*Example 8*

A violet dyestuff of the following constitution:

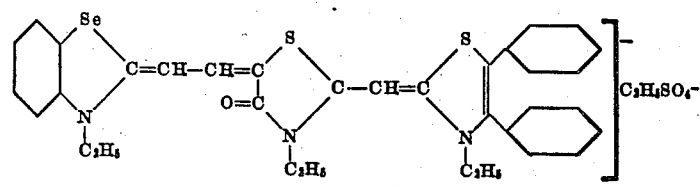

| | Mμ |
|---|---|
| Absorption maximum in methanol | 595 |
| Sensitizing maximum | 620 |
| Sensitizing range | 540 to 660 |

*Example 9*

A blue-green dyestuff of the following constitution:

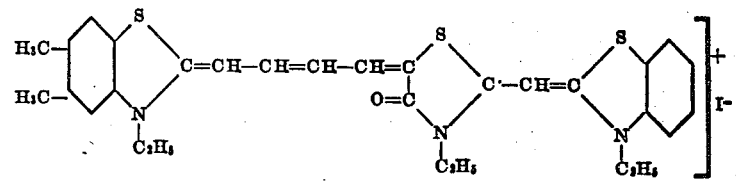

| | Mμ |
|---|---|
| Absorption maximum in methanol | 670 |
| Sensitizing maximum | 715 |
| Sensitizing range | 640 to 740 |

Example 10

A green dyestuff of the following constitution:

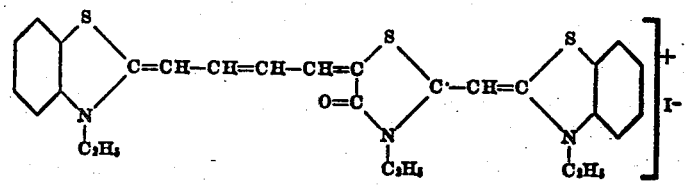

|   | Mμ |
|---|---|
| Absorption maximum in methanol | 700 |
| Sensitizing maximum | 725 |
| Sensitizing range | 650 to 760 |

Example 11

A green-blue dyestuff of the constitution:

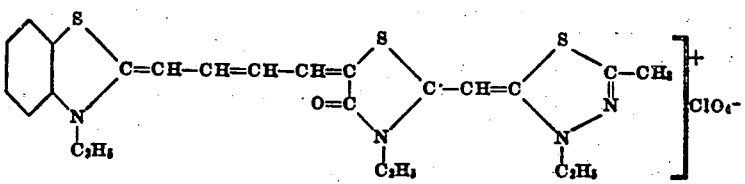

|   | Mμ |
|---|---|
| Absorption maximum in methanol | 675 |
| Sensitizing maximum | 710 |
| Sensitizing range | 660 to 740 |

Example 12

An ice-blue dyestuff of the following constitution:

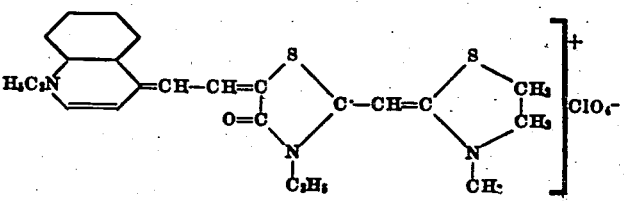

|   | Mμ |
|---|---|
| Absorption maximum | 650 |
| Sensitizing maximum | 695 |
| Sensitizing range | 625 to 725 |

Example 13

A blue dyestuff of the following constitution:

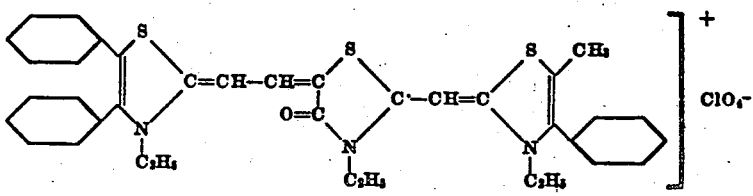

|   | Mμ |
|---|---|
| Absorption maximum | 620 |
| Sensitizing maximum | 650 |
| Sensitizing range | 555 to 675 |

Example 14

A blue-green dyestuff of the following constitution:

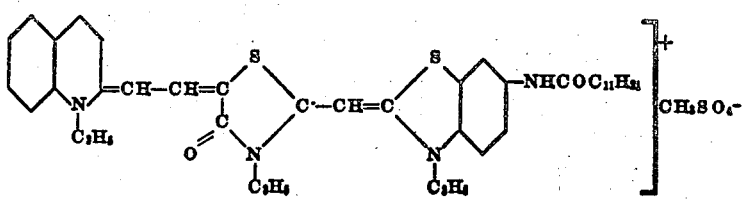

The sensitizers are added to the emulsion in amounts of 2 to 30 mg. per kilo of emulsion. In special cases, however, these amounts may be greater or smaller.

As dyestuff components which are added to silver halide emulsions together with the sensitizers especially such dyestuff components are suitable as are capable of developing a blue picture for instance derivatives of α-naphthol. Such dyestuff components for color-forming development are preferably employed which contain a group having a constitution which hinders diffusion of the dyestuff component in and from the emulsion and which renders the dyestuff components soluble in aqueous liquids.

Dyestuff components having long chain aliphatic radicals and sulfogroups, for instance 1-N-stearoylamino- 4 - N -(-1'-hydroxy - 2'- naphthoyl - 4 - sulfonic acid-sodium) - phenylene-diamine (see U. S. patent application Ser. No. 94,340 filed August 5, 1936) and dyestuff and components with substantive groups (see U. S. patent application Ser. No. 72,718 filed April 4, 1936) for instance α-hydroxy-naphthoic acid benzidide may be named as examples.

The dyestuff components are added to the emulsion in an amount of about 10 grams per kilo.

We claim:
1. A silver halide emulsion containing a dyestuff component for color-forming development of the α-naphthol series said dyestuff component containing a group having a chemical constitution which hinders diffusion of the dyestuff component and a sensitizing dye of the following general formula:

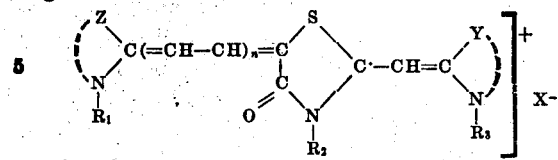

wherein
Y and Z are members of the group consisting of

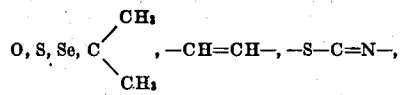

Y and Z being members of heterocyclic rings or condensed heterocyclic ring systems which may be substituted,
$R_1$, $R_2$, and $R_3$ stand for a member of the group consisting of H, alkyl, aralkyl, aryl,
X stands for an anion, for instance Cl, Br, I, $SO_4H$, $ClO_4$, $SO_4CH_3$, $SO_4C_2H_5$, and
$n$ stands for a whole number smaller than 3.

2. A silver halide emulsion as defined in claim 1, wherein said sensitizing dye has the following constitution

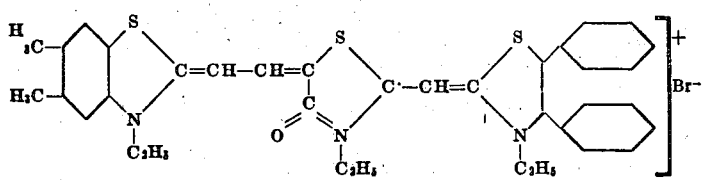

3. A silver halide emulsion as defined in claim 1, wherein said sensitizing dye has the following constitution

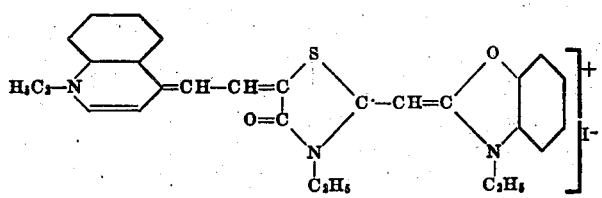

4. A silver halide emulsion as defined in claim 1, wherein said sensitizing dye has the following constitution

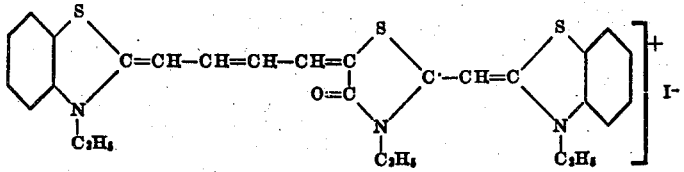

GUSTAV WILMANNS.
OSKAR RIESTER.